US010477097B2

(12) United States Patent
Zheng

(10) Patent No.: US 10,477,097 B2
(45) Date of Patent: Nov. 12, 2019

(54) SINGLE-FRAME AUTOFOCUSING USING MULTI-LED ILLUMINATION

(71) Applicant: University of Connecticut, Farmington, CT (US)

(72) Inventor: Guoan Zheng, Vernon, CT (US)

(73) Assignee: University of Connecticut, Farmington, CT (US)

( * ) Notice: Subject to any disclaimer, the term of this patent is extended or adjusted under 35 U.S.C. 154(b) by 57 days.

(21) Appl. No.: 15/860,229

(22) Filed: Jan. 2, 2018

(65) Prior Publication Data
US 2018/0191948 A1 Jul. 5, 2018

Related U.S. Application Data

(60) Provisional application No. 62/441,727, filed on Jan. 3, 2017.

(51) Int. Cl.
*H04N 5/33* (2006.01)
*H04N 5/225* (2006.01)
(Continued)

(52) U.S. Cl.
CPC ......... *H04N 5/23212* (2013.01); *G02B 7/365* (2013.01); *G02B 21/06* (2013.01);
(Continued)

(58) Field of Classification Search
CPC ...... G02B 21/02; G02B 21/06; G02B 21/244; G02B 21/245; G02B 21/361;
(Continued)

(56) References Cited

U.S. PATENT DOCUMENTS 4,262,988 A 4/1981 Ishibai et al.
4,625,103 A 11/1986 Kitamura et al.
(Continued)

FOREIGN PATENT DOCUMENTS

WO WO 2014/016839 1/2014

OTHER PUBLICATIONS

PCT International Search Report and Written Opinion for PCT/US2016/044312 dated Oct. 7, 2016.
(Continued)

*Primary Examiner* — Anner N Holder
(74) *Attorney, Agent, or Firm* — McCarter & English, LLP

(57) ABSTRACT

Instruments, assemblies and methods are provided for undertaking imaging techniques (e.g., microscopic imaging techniques). The present disclosure provides improved imaging techniques, equipment and systems. More particularly, the present disclosure provides advantageous microscopy/imaging assemblies with single-frame sample autofocusing using multi-LED illumination. The present disclosure provides for assemblies and methods for single-frame rapid sample autofocusing without a z-scan. Potential applications for the disclosed assemblies/methods include, without limitation, whole slide imaging, optical metrology, wafer inspection, DNA sequencing and other high-throughput imaging applications where the sample may need to be scanned over a large field of view. The assemblies/methods advantageously utilize multiple LEDs for sample illumination. A captured image includes multiple copies of the sample, and one can recover the distance between these copies. The distance is directly related to the defocus distance.

30 Claims, 10 Drawing Sheets

(51) Int. Cl.
*H04N 5/232* (2006.01)
*G06T 3/20* (2006.01)
*G06T 7/70* (2017.01)
*G06N 3/04* (2006.01)
*G02B 21/06* (2006.01)
*G02B 21/24* (2006.01)
*G02B 21/36* (2006.01)
*G02B 7/36* (2006.01)
*G02B 21/02* (2006.01)

(52) U.S. Cl.
CPC ........ *G02B 21/244* (2013.01); *G02B 21/245* (2013.01); *G02B 21/362* (2013.01); *G02B 21/365* (2013.01); *G06N 3/04* (2013.01); *G06T 3/20* (2013.01); *G06T 7/70* (2017.01); *H04N 5/33* (2013.01); *G02B 21/02* (2013.01); *G02B 21/361* (2013.01); *G06T 2207/10048* (2013.01); *G06T 2207/10056* (2013.01); *G06T 2207/20081* (2013.01); *H04N 5/2253* (2013.01); *H04N 5/2256* (2013.01)

(58) Field of Classification Search
CPC ...... G02B 21/362; G02B 21/365; G06N 3/04; G06T 2207/10048; G06T 2207/10056; G06T 2207/20081; G06T 3/20; G06T 7/70; H04N 5/2253; H04N 5/2256; H04N 5/23212; H04N 5/33
See application file for complete search history.

(56) References Cited

U.S. PATENT DOCUMENTS

| | | | |
|---|---|---|---|
| 2010/0033811 A1* | 2/2010 | Westphal | G02B 7/36 359/368 |
| 2011/0315851 A1 | 12/2011 | Kishima et al. | |
| 2012/0075455 A1* | 3/2012 | Hiraide | G02B 21/247 348/79 |
| 2014/0168404 A1* | 6/2014 | Westphal | G02B 21/245 348/79 |
| 2015/0005032 A1 | 1/2015 | Fletcher et al. | |
| 2015/0160450 A1* | 6/2015 | Ou | G02B 21/002 348/80 |
| 2015/0212012 A1* | 7/2015 | Barak | G02B 21/0016 702/182 |
| 2015/0296126 A1* | 10/2015 | Okugawa | G02B 7/36 348/345 |
| 2015/0309297 A1* | 10/2015 | Westphal | G02B 21/244 359/363 |
| 2018/0149853 A1* | 5/2018 | Honegger | G02B 7/38 |
| 2018/0329194 A1* | 11/2018 | Small | G02B 21/245 |

OTHER PUBLICATIONS

U.S. Appl. No. 15/221,374, filed Jul. 27, 2016, US 2017/0031146 A1.
U.S. Appl. No. 62/197,283, filed Jul. 27, 2015.
U.S. Appl. No. 62/441,727, filed Jan. 3, 2017.

* cited by examiner

FIG. 3A
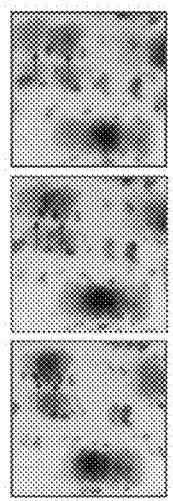
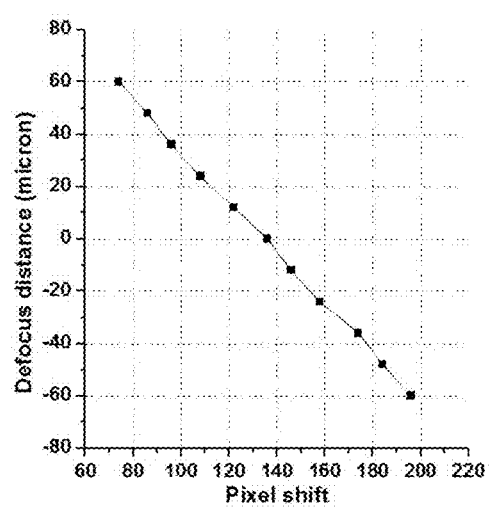
FIG. 3B
FIG. 3C FIG. 3D

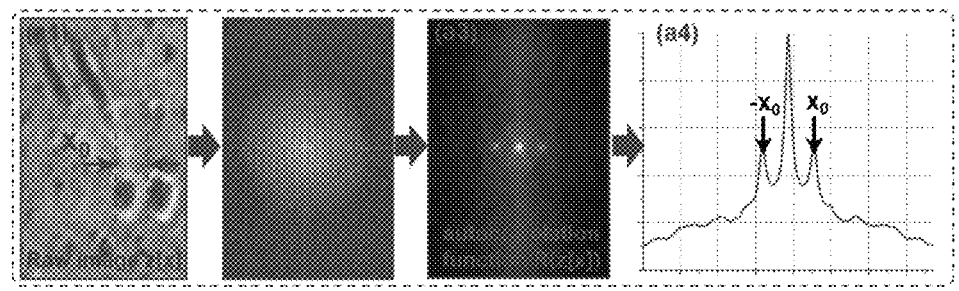
FIG. 4A1    FIG. 4A2    FIG. 4A3    FIG. 4A4

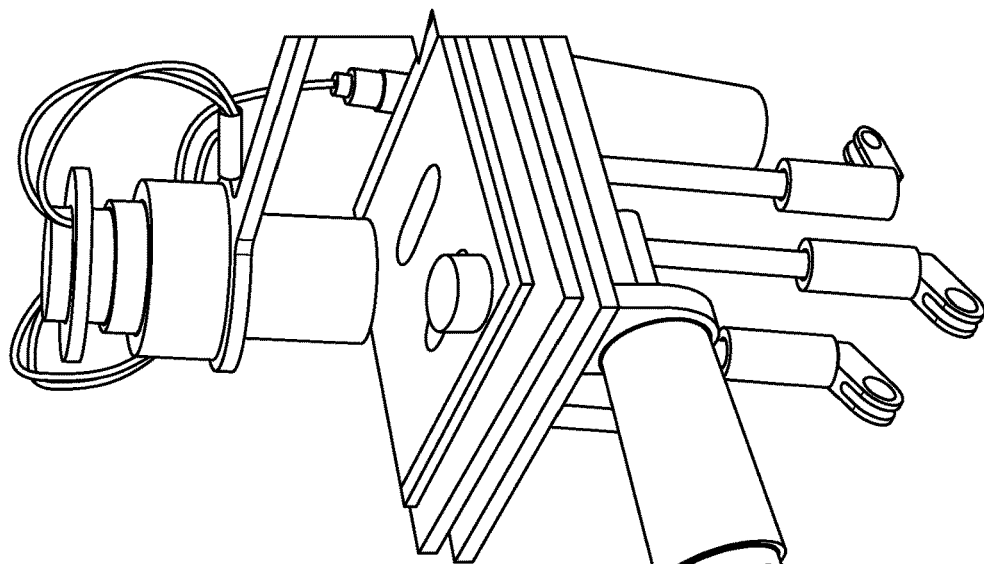
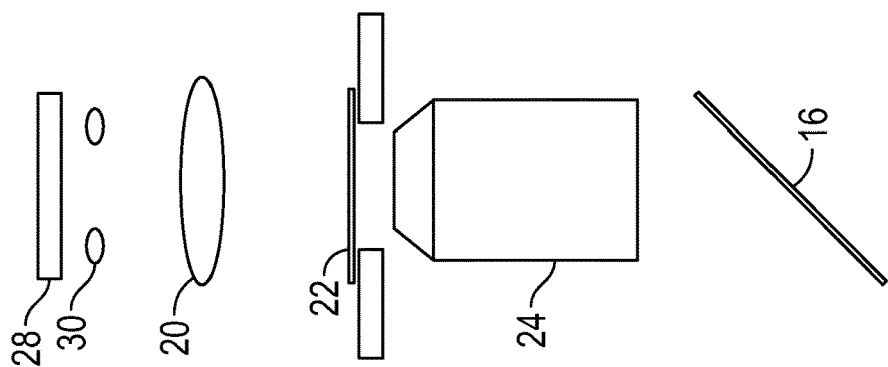
FIG. 6A
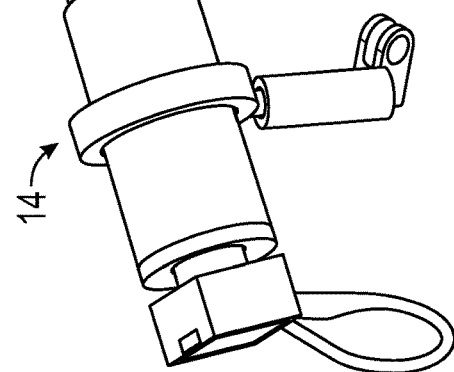
FIG. 6B

FIG. 8A1    FIG. 8A2    FIG. 8A3
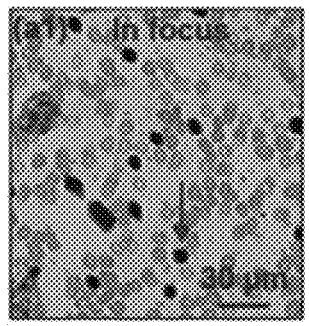 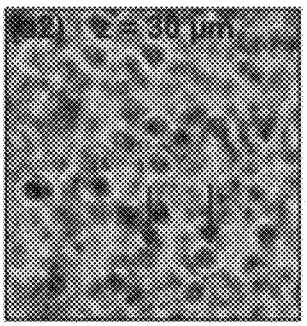 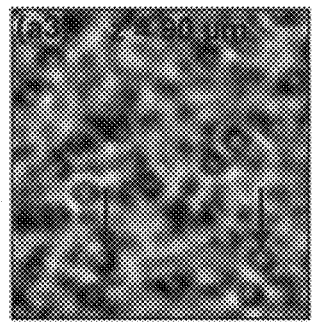
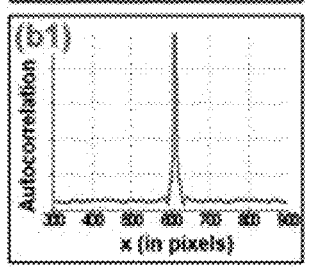 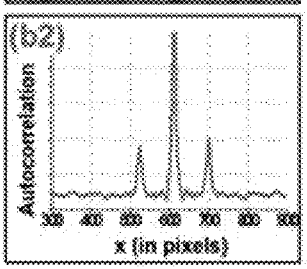 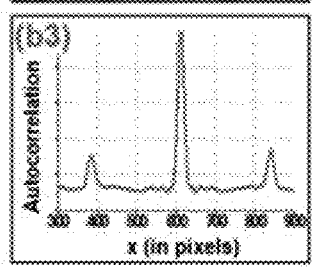
FIG. 8B1    FIG. 8B2    FIG. 8B3
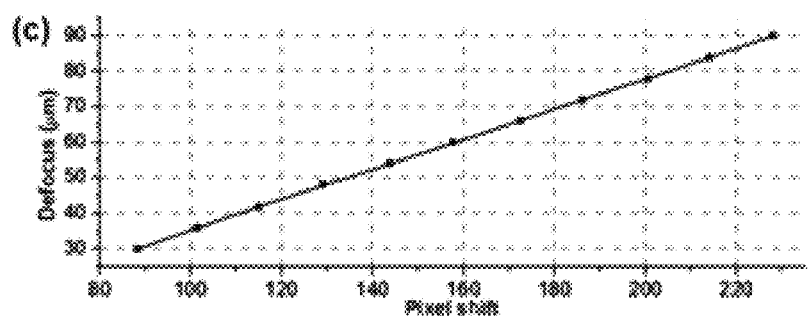
FIG. 8C FIG. 9A1  FIG. 9B1  FIG. 9C1
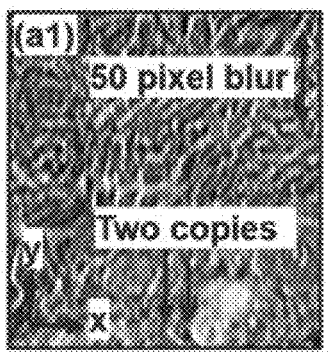 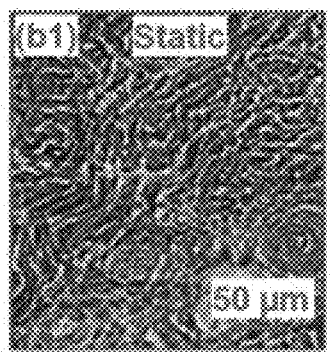 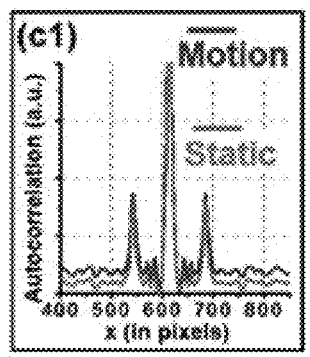
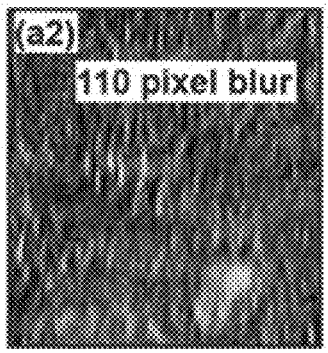 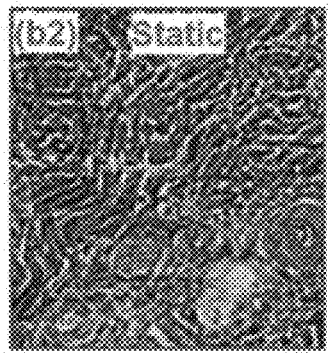 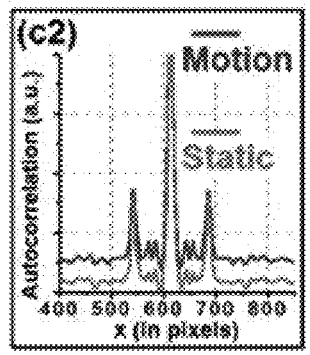
FIG. 9A2  FIG. 9B2  FIG. 9C2

SINGLE-FRAME AUTOFOCUSING USING MULTI-LED ILLUMINATION

CROSS-REFERENCE TO RELATED APPLICATIONS

The present application claims priority benefit to U.S. Provisional Patent Application No. 62/441,727, entitled "Single-Frame Autofocusing using Multi-LED Illumination," which was filed on Jan. 3, 2017. The content of the foregoing provisional application is hereby incorporated by reference.

STATEMENT OF GOVERNMENT SUPPORT

This invention was made with Government support under Grant 1555986 awarded by the National Science Foundation. The government has certain rights in the invention.

FIELD OF THE DISCLOSURE

The present disclosure relates generally to the field of imaging techniques, equipment and systems and, more particularly, to microscopy/imaging assemblies with single-frame sample autofocusing using multi-light-emitting diode ("multi-LED") illumination.

BACKGROUND OF THE DISCLOSURE

In general, high-density solid-state detector technology, coupled with affordable, terabyte-scale data storage, has greatly facilitated the development of high-throughput imaging instruments. In the biological realm, high-throughput digital imaging has undergone a period of exponential growth catalyzed by changes in imaging hardware and the need of big-data-driven analysis. In particular, high-throughput whole slide imaging ("WSI") systems have found important life-science applications, including molecular profiling, live-cell assays, drug discovery, large-scale brain mapping, rare cell screening, RNA interference studies, etc.

In the medical realm, there has been an upsurge in worldwide attention on digital pathology, which converts tissue sections into digital slides that can be viewed, managed, and analyzed on computer screens. Converting microscope slides into digital images also enable teleconsultations and adoption of artificial intelligence technologies for disease diagnosis. This field represents an emerging market.

A technical barrier for high-throughput WSI instruments is the time-consuming autofocusing process, which imposes a limit on the achievable throughput and may cause photo-bleaching damages to the samples. Autofocusing issues have often been cited as the culprit for poor image quality in digital pathology, in particular for tissue sections with low image contrast. This is generally not because autofocusing is difficult to do, but rather because of the typical need to perform accurate autofocusing at high speed.

There are two types of completing autofocusing methods in current high-throughput imaging systems: 1) laser reflection based methods and 2) image contrast based methods.

For laser-reflection based methods, an infrared laser beam is reflected by the glass surface and creates a reference point to determine the distance between the glass surface and the objective lens, as shown in FIG. 1A. This method works well for a sample that has a fixed distance off the glass surface. However, this method can fail if a sample varies its location from the surface, such as with tissue slides. This may be because the focus is maintained at a constant distance above the glass surface, and thus, it cannot track the sample topography variations above the surface.

Different from the laser-reflection method, the image-contrast-based methods generally track topographic variations and identify the optimal focal position through image processing, as shown in FIG. 1B.

This method acquires multiple images by moving the sample along the z direction and attempts to calculate the optimal focal position by maximizing a figure of merit of the acquired images (such as image contrast, entropy, and frequency content). Evident by its name, this method generally relies on the contrast of the sample and it can be difficult to handle transparent or low-contrast samples.

Since z-stacking increases the total scanning time, image-contrast-based methods can achieve improved imaging performance by trading off system throughput. It is noted that focusing on every tile can be time-consuming. To attempt to alleviate the time burden, some conventional WSI systems create a "focus map" prior to scanning, or survey focus points every n tiles in effect skipping areas to sacrifice the focusing accuracy. Each focal point is then triangulated to re-create a theoretical map of the topographic surface of the sample.

In some current automated imaging systems, the laser-based method is mainly used in surface inspection and some life-science applications, where the samples have a fixed distance off the reference surface.

The image-contrast-based method, on the other hand, can track the topographic variation of the sample above the glass surface and can be employed in some commercial WSI systems. Despite its application in current WSI systems, it is unclear whether the image-contrast-based method can be used for high-throughput fluorescence imaging, where samples are typically transparent under the bright-field illumination. If one uses the brightfield channel for autofocusing, no substantial image contrast will be generated in the captured images. If one uses the fluorescence channel for autofocusing, it can be time-consuming to capture multiple fluorescence images under the low-light condition. The sample may also be damaged due to the photo-bleaching effect.

A need exists among end-users and/or manufacturers to develop microscopy/imaging assemblies that include improved features/structures. In addition, a need remains for instruments, assemblies and methods that allow imaging techniques (e.g., microscopic imaging techniques) through designs and techniques that are easily understood and implemented.

Thus, an interest exists for improved microscopy/imaging assemblies and related methods of use. These and other inefficiencies and opportunities for improvement are addressed and/or overcome by the assemblies, systems and methods of the present disclosure.

SUMMARY OF THE DISCLOSURE

According to the present disclosure, advantageous instruments, assemblies and methods are provided for undertaking imaging techniques (e.g., microscopic imaging techniques).

The present disclosure provides improved imaging techniques, equipment and systems. More particularly, the present disclosure provides advantageous microscopy/imaging assemblies with single-frame sample autofocusing using multiple light-emitting diode ("multi-LED") illumination.

In exemplary embodiments, the present disclosure provides for assemblies and methods for single-frame rapid sample autofocusing without a z-scan. Some potential applications for the assemblies/methods of the present disclosure include, without limitation, whole slide imaging, optical metrology, wafer inspection, DNA sequencing and other high-throughput imaging applications where the sample may need to be scanned over a large field of view.

The assemblies/methods of the present disclosure provide several advantages (e.g., more robust, easier to set-up, more precise on focal plane estimation, include longer autofocusing ranges). Moreover, the exemplary assemblies/methods of the present disclosure do not include the alignment of pinholes (see, e.g., U.S. patent application Ser. No. 15/221,374, the contents of which is hereby incorporated by reference in its entirety).

In comparison, the multi-LED approach provides a broader light configuration, an enhanced resolution of the captured autofocusing image, and an increased z-range for autofocusing. The multi-LED approach employs a light configuration that utilizes multiple LEDs and generally eliminates the need for a filtering mask located within the detection path of the multi-LED system. The removal of the filtering mask further provides enhanced resolution of the captured autofocus image. The enhanced resolution leads to an increase in precision for predicting the defocus distance. Despite an increase in precision, the multi-LED approach features an enhanced autofocusing z-range as a result of the plane wave illumination from the LED elements.

As mentioned above, the assemblies/methods of the present disclosure advantageously utilize multiple LEDs for sample illumination. However, according to the present disclosure, LEDs may be replaced (in whole or in part) by alternative light sources or other lighting means, e.g., laser diodes, filaments, and/or placing an aperture at the pupil plane of a condenser lens. A captured image includes multiple copies of the sample, and one can recover the distance between these copies. The distance is directly related to the defocus distance.

Current practice provides that multiple images are captured by moving the sample to different z-planes. The focal position is then recovered by maximizing the image contrast.

In exemplary embodiments, the assemblies/methods of the present disclosure only need one image and no z-scanning is needed. As such, the assemblies/methods of the present disclosure reduce the time needed for autofocusing in high-throughput imaging applications. The exemplary assemblies/methods can also estimate the focal plane with higher accuracy, and provide longer autofocusing ranges.

The present disclosure provides for an imaging assembly including (i) a microscope having a lens, (ii) an autofocusing camera positioned adjacent to the microscope, and (iii) first and second LEDs positioned adjacent to the microscope, wherein the first and second LEDs are configured and adapted to illuminate a sample of the microscope from two different incident angles, wherein the autofocusing camera is configured and adapted to provide an image of the illuminated sample, the image including two image copies of the sample, and wherein identification of a translational shift of the two image copies allows a user to identify an in-focus position of the sample.

In exemplary implementations of the disclosed imaging assembly, the lens is a condenser lens, and light from the first and second LEDs is transmitted to the back focal plane of the condenser lens to illuminate the sample from the two different incident angles. In further exemplary implementations of the disclosed imaging assembly, the lens is an objective lens, and light from the first and second LEDs is transmitted to the back focal plane of the objective lens to illuminate the sample from the two different incident angles. The first and second LEDs may be infrared LEDs.

In exemplary implementations of the disclosed imaging assembly, an autofocusing camera may be mounted to the main camera port of the microscope or to an autofocusing module attached to the microscope. The autofocusing camera may be used for autofocusing and/or capturing high-resolution-images.

The disclosed imaging assembly may further include a mirror positioned adjacent to the microscope, the mirror configured and dimensioned to reflect and transmit light from the first and second LEDs to the autofocusing camera. The mirror may be a 45-degree hot mirror. The identification of the in-focus position of the sample my occur without scanning the sample along the depth or z-direction of the sample. In exemplary implementations of the disclosed imaging assembly, the in-focus position of the sample is provided through a main camera port of the microscope. The autofocusing camera may be mounted to the microscope or an autofocusing module.

The present disclosure further provides an imaging method that includes: (i) providing a microscope having a lens, (ii) positioning an autofocusing camera adjacent to the microscope, (iii) positioning first and second LEDs adjacent to the microscope, (iv) illuminating a sample of the microscope from two different incident angles via the first and second LEDs, (v) acquiring an image of the illuminated sample via the autofocusing camera, the image including two image copies of the sample, (vi) utilizing the image to identify a translational shift of the two image copies; and (vii) utilizing the translational shift of the two image copies to identify an in-focus position of the sample.

In exemplary implementations of the disclosed imaging method, the lens is a condenser lens, and light from the first and second LEDs is transmitted to the back focal plane of the condenser lens to illuminate the sample from the two different incident angles. The lens may be an objective lens, and light from the first and second LEDs is transmitted to the back focal plane of the objective lens to illuminate the sample from the two different incident angles. The first and second LEDs may be infrared LEDs.

The autofocusing camera may be mounted to the main camera port of the microscope or to an autofocusing module attached to the microscope. The autofocusing camera may be used for autofocusing and/or capturing high-resolution-images.

A mirror may be positioned adjacent to the microscope, the mirror configured and dimensioned to reflect and transmit light from the first and second LEDs to the autofocusing camera. In exemplary embodiments, the mirror is a 45-degree hot mirror.

Identification of the in-focus position of the sample may occur without scanning the sample along the depth or z-direction of the sample. The in-focus position of the sample may be provided through a main camera port of the microscope. The autofocusing camera may be mounted to the microscope or to an autofocusing module.

The present disclosure further provides for a second imaging assembly including: (i) a microscope having a lens, (ii) an autofocusing camera positioned adjacent to the microscope, (iii) first and second LEDs positioned adjacent to the microscope, (iv) a microscope sample illuminated from two different incident angles via the first and second LEDs, (v) an image of the illuminated sample via the autofocusing camera, and (vi) a convolution neural network utilized to identify the in-focus position of the sample.

In exemplary implementations of the second disclosed imaging assembly, the lens is a condenser lens, and light from the first and second LEDs is transmitted to the back focal plane of the condenser lens to illuminate the sample from two different incident angles. In further exemplary implementations of the second disclosed imaging assembly, the lens is an objective lens, and light from the first and second LEDs is transmitted to the back focal plane of the objective lens to illuminate the sample from two different incident angles. The first and second LEDs may be visible, near-infrared or infrared LEDs.

In exemplary implementations of the second disclosed imaging assembly, the autofocusing camera may be mounted to the main camera port of the microscope or to an autofocusing module attached to the microscope. The autofocusing camera may be used for both autofocusing purpose and capturing high-resolution-image purpose.

Identification of the in-focus position of the sample may occur without scanning the sample along the depth or z-direction of the sample. The sample may be in static or in continuous motion in the autofocusing process. The convolution neural network may utilize the acquired image, the Fourier transform of the acquired image, the autocorrelation of the acquired image, and combinations thereof. The output layer of the convolution neural network may be a regression or classification layer.

Any combination or permutation of embodiments is envisioned. Additional advantageous features, functions and applications of the disclosed systems, assemblies and methods of the present disclosure will be apparent from the description which follows, particularly when read in conjunction with the appended figures. All references listed in this disclosure are hereby incorporated by reference in their entireties.

BRIEF DESCRIPTION OF THE DRAWINGS

Features and aspects of embodiments are described below with reference to the accompanying drawings, in which elements are not necessarily depicted to scale.

Exemplary embodiments of the present disclosure are further described with reference to the appended figures. It is to be noted that the various features, steps and combinations of features/steps described below and illustrated in the figures can be arranged and organized differently to result in embodiments which are still within the scope of the present disclosure. To assist those of ordinary skill in the art in making and using the disclosed assemblies, systems and methods, reference is made to the appended figures, wherein:

FIGS. 3A-3D show an exemplary auto-focusing assembly/method; the captured images in each of FIGS. 3A-3C each contain two copies of the sample; by identifying the lateral distance of these two copies (e.g., the distance between the two arrows in FIG. 3A), one can recover the defocus distance of the sample, as shown in FIG. 3D;

FIGS. 4A1-4A4 show exemplary procedures for recovering the translational shift from a single captured image $z[x]$; FIG. 4A1 shows the captured image $z[x]$ from the autofocusing camera; FIG. 4A2 shows the Fourier power spectrum of the captured image (showing the log scale to better visualize the fringe pattern); FIG. 4A3 shows the autocorrelation function $R(z[x])$, which can be computed by taking a Fourier transform of FIG. 4A2; FIG. 4A4 shows the line trace of FIG. 4A3 and the locations of the peaks;

FIGS. 6A and 6B show an exemplary autofocusing assembly/method; FIG. 6A shows an exemplary implementation scheme; and FIG. 6B shows an experimental prototype setup;

FIGS. 8A1-8C show an exemplary autofocusing assembly/method of a captured image, specifically a blood-smear image; FIG. 8A1 shows the captured image in focus; FIG. 8A2 shows two copies of the captured image at a $z_{offset}$ of 30 μm; FIG. 8A3 shows two copies of the captured image at a $z_{offset}$ of 90 μm; FIGS. 8B1-8B3 show the autocorrelation plots corresponding to the captured images from FIGS. 8A1-8A3; FIG. 8C shows the relationship between the defocus distance and the pixel shift of the two copies;

FIGS. 9A1-9C2 show a comparison of captured images during continuous sampling, specifically, skin-tissue images; FIG. 9A1 shows the captured image with a 50 pixel blur in the y-direction; FIG. 9A2 shows the captured image with a 110 pixel blur in the y-direction;

FIGS. 9B1 and 9B2 show the corresponding static images to FIGS. 9A1 and 9A2; FIG. 9C1 shows a comparison of the autocorrelation curves between the blurred image from FIG. 9A1 and the static image from 9B1; FIG. 9C2 shows a comparison of the autocorrelation curves between the blurred image from FIG. 9A2 and the static image from 9B2.

DETAILED DESCRIPTION OF DISCLOSURE

Figures 1A, 1B:
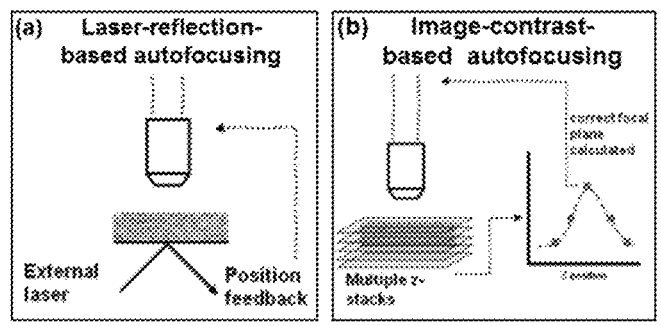
FIGS. 1A-1B show two types of auto-focusing methods in conventional WSI systems.

The exemplary embodiments disclosed herein are illustrative of advantageous microscopy/imaging assemblies, and systems of the present disclosure and methods/techniques thereof. It should be understood, however, that the disclosed embodiments are merely exemplary of the present disclosure, which may be embodied in various forms. Therefore, details disclosed herein with reference to exemplary imaging assemblies/fabrication methods and associated processes/techniques of assembly and use are not to be interpreted as limiting, but merely as the basis for teaching one skilled in the art how to make and use the advantageous imaging assemblies/systems and/or alternative assemblies of the present disclosure.

Advantageous instruments, assemblies and methods are provided for undertaking imaging techniques (e.g., microscopic imaging techniques). The present disclosure provides improved imaging techniques, equipment and systems. More particularly, the present disclosure provides advantageous microscopy/imaging assemblies with single-frame sample autofocusing using multi-LED illumination.

The multi-LED approach further provides a broader light configuration, an enhanced resolution of the captured autofocusing image, and an increased z-range for autofocusing. The multi-LED approach employs a light configuration that utilizes multiple LEDs and eliminates the filtering mask at the detection path of the multi-LED system. Removal of the filtering mask further provides enhanced resolution of the captured autofocusing image. The enhanced resolution leads to an increase in precision for predicting the defocus distance. Despite an increase in precision, the multi-LED approach features an enhanced autofocusing z-range as a result of the plane wave illumination from the LED elements.

In general, the present disclosure provides for assemblies and methods for single-frame rapid sample autofocusing without a z-scan. Some potential applications for the assemblies/methods of the present disclosure include, without limitation, whole slide imaging, optical metrology, wafer inspection, DNA sequencing and other high-throughput imaging applications where the sample may need to be scanned over a large field of view.

The assemblies/methods of the present disclosure provide several advantages (e.g., more robust, easier to set-up, more precise on focal plane estimation, include longer autofocusing ranges). Moreover, the exemplary assemblies/methods of the present disclosure do not include the alignment of pinholes.

The assemblies/methods advantageously utilize multiple LEDs for sample illumination. A captured image includes multiple copies of the sample, and one can recover the distance between these copies. The distance is directly related to the defocus distance.

Conventional practice provides that multiple images are captured by moving the sample to different z-planes, and the focal position is then recovered by maximizing the image contrast.

The exemplary assemblies/methods of the present disclosure only need one image and no z-scanning is needed. As such, the assemblies/methods of the present disclosure reduce the time needed for autofocusing in high-throughput imaging applications. The exemplary assemblies/methods can also estimate the focal plane with higher accuracy, and provide longer autofocusing ranges. In exemplary embodiment, the present disclosure provides for assemblies/methods that utilize two or more LEDs (e.g., two or more infrared LEDs) to illuminate the sample from different incident angles.

One can position a mirror (e.g., a 45 degree hot mirror) in the detection path to direct the light (e.g., infrared light) from the LEDs to an image sensor or autofocusing camera.

For out-of-focused objects, the captured image from the image sensor/autofocusing camera includes two or more copies of the sample separated by certain distances. By identifying the separated distance, one can then recover the defocus distance of the sample without a z-scan.

The present disclosure will be further described with respect to the following examples; however, the scope of the disclosure is not limited thereby. The following examples illustrate the advantageous imaging assemblies, systems and methods of the present disclosure.

Example 1: Single-Frame Sample Autofocusing Using Multi-LED Illumination

Figure 2:
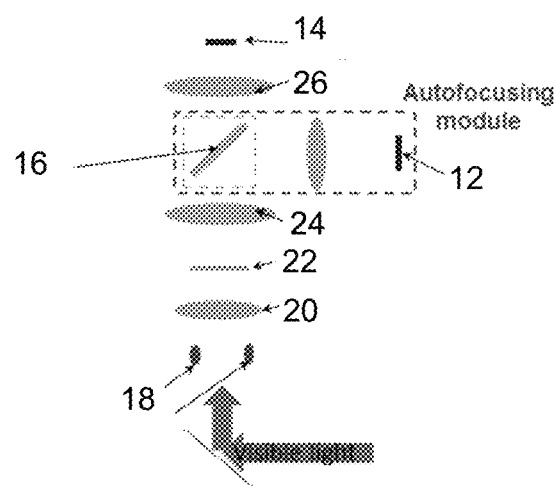
FIG. 2 depicts an exemplary imaging assembly with single-frame sample autofocusing using multi-LED illumination.

In exemplary embodiments, the present disclosure provides a new and advantageous autofocusing assembly/method using only one captured image, as shown in FIG. 2.

As shown in FIG. 2, one can position (or use a lens to relay) two or more LEDs (e.g., two or more infrared LEDs) to the back focal plane of the condenser lens 20 (e.g., condenser lens of a microscope or the like).

Therefore, these two or more LEDs 18 are configured and adapted to illuminate the sample 22 from two or more different incident angles.

At the detection path, one can position a mirror 16 (e.g., a 45-degree hot mirror) to reflect the infrared light from the two or more infrared LEDs to the autofocusing image sensor/camera 12 (e.g., autofocusing image sensor/camera 12 within the autofocusing module).

In exemplary embodiments, it is noted that regular visible light remains unchanged and can be detected by the image sensor/camera 14 (e.g., image sensor/camera 14 of the microscope).

As such, FIG. 2 shows that two (or more) infrared LEDs 18 can be used to illuminate the sample from two different incident angles (e.g., each LED has a distinct incident angle different from one another). A hot mirror 16 can be used to reflect the infrared light from the two LEDs 18 that passes through objective lens 24 and to the autofocusing camera/image sensor 12. Visible light remains substantially unchanged as it passes through tube lens 26 and is detected by camera/image sensor 14.

In exemplary embodiments, since the sample is illuminated from at least two different incident angles, the captured image of the sample from the autofocusing image sensor/camera 12 contains two image copies of the sample, as shown in FIGS. 3A-3C.

If the sample is placed at the in-focus position, these two image copies do not have a lateral or translational shift between them.

If the sample is placed at an out-of-focus position, these two image copies will have a lateral or translational shift between them.

Based on this lateral or translational shift, one can recover the defocus distance of the sample.

FIGS. 3A-3D show an exemplary auto-focusing assembly/method. The captured images in each of FIGS. 3A-3C each contain two image copies of the sample.

By identifying the lateral distance or translational shift of these two image copies (e.g., the distance between the two arrows in FIG. 3A), one can recover the defocus distance of the sample, as shown in FIG. 3D.

FIGS. 4A1-4A4 summarize an exemplary procedure/method. One can compute the Fourier power spectrum in FIG. 4A2 and then perform a fast Fourier transform (FFT) to get the autocorrelation function R(z[x]) in FIG. 4A3.

The distance $x_0$ can be recovered from the distance between the two first-order peaks in FIG. 4A4.

As such, FIGS. 4A1-4A4 show exemplary procedures for recovering the translational shift from a single captured image z[x]. FIG. 4A1 shows the captured image z[x] from the autofocusing camera 12.

FIG. 4A2 shows the Fourier power spectrum of the captured image (showing the log scale to better visualize the fringe pattern).

FIG. 4A3 shows the autocorrelation function R(z[x]), which can be computed by taking a Fourier transform of FIG. 4A2.

FIG. 4A4 shows the line trace of FIG. 4A3 and the locations of the peaks.

Figure 5:
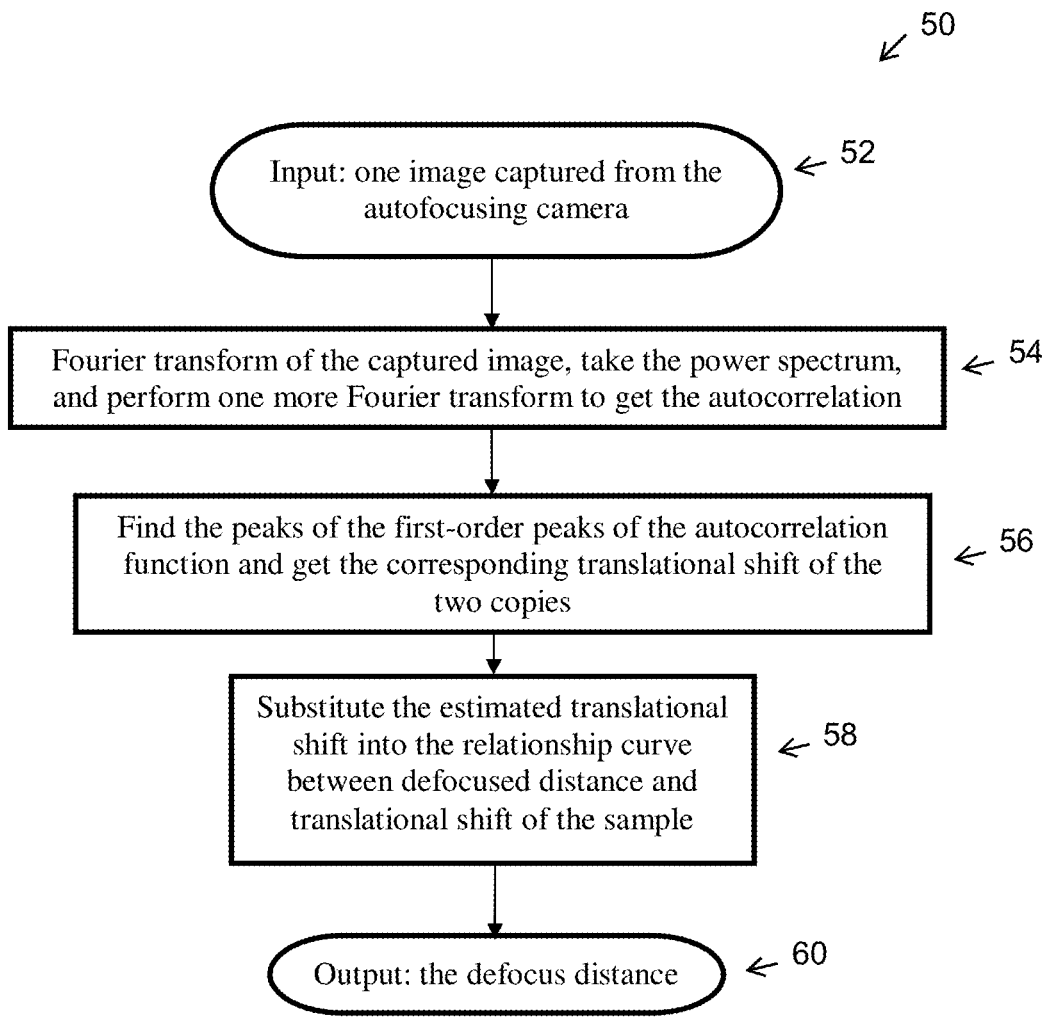
FIG. 5 shows an exemplary flow chart to recover the defocus distance of a sample.

FIG. 5 shows an exemplary flow chart to recover the defocus distance of a sample.

As shown in FIG. 5, an exemplary system/method 50 includes step 52 of acquiring and inputting one image (e.g., FIG. 3A) from the camera 12.

Next, at step 54, one can find the Fourier transform of the captured image, take the power spectrum, and perform one more Fourier transform to get the autocorrelation function.

Next, at step 56, one can find the peaks of the first-order peaks of the autocorrelation function and get the corresponding translational shift of the two image copies.

Then, at step 58, one can substitute the estimated translational shift into the relationship curve between the defocused distance and the translational shift of the sample.

At step 60, the output can then be the defocus distance of the sample.

There are at least four extensions of this autofocusing system/method.

First, it is noted that one can set an offset distance to the autofocusing image sensor 12 in FIG. 2. In this case, when the sample is in-focus, it will introduce a certain amount of lateral or translational shift of the two image copies in FIG. 3A (or FIG. 3B, or FIG. 3C).

Secondly, it is noted that FIG. 2 only shows two infrared LEDs for sample illumination. One can use 'n' (n>=2) LEDs to illuminate the sample from different incident angles. In such cases, the captured image from the autofocusing camera 12 will contain 'n' image copies for the sample separated by certain distances.

Third, one can use infrared LEDs in FIG. 1. One can also use LEDs from other wavelengths, not just infrared.

Fourth, it is noted that FIG. 1 shows a transmission mode. This scheme can be implemented in a reflection mode. In this case, the two (or more) LEDs can be placed at the epi-illumination arm. One can use a lens to relay the two (or more) LEDs to the back focal plane of the objective lens. As such, the light from the two (or more) LEDs illuminate the reflective sample from different incident angles and the reflected light from the sample will be detected by the autofocusing image sensor 12. As such, the steps/procedures in FIG. 5 and as discussed above can be used to recover the defocused distance of the sample.

Example 2: Multi-LED Illumination Scheme for Autofocusing

In an exemplary embodiment, the present disclosure provides a new and advantageous autofocusing assembly/method using one captured image, as shown in FIG. 6. FIG. 6A depicts an exemplary implementation scheme and FIG. 6B depicts an experimental prototype setup. The disclosed embodiment requires no axial scanning and no additional camera and/or lens. Indeed, the disclosed embodiment provides effective results for stained and transparent samples, and allows continuous sample motion in the surveying process.

As shown in FIG. 6A, two or more LEDs are positioned in the illumination path at the back focal plane of the condenser lens to simultaneously illuminate the sample with two or more different oblique incident angles. The LEDs can be partially coherent light sources and generate coherent contrast for samples at an out-of-focus region.

In an exemplary embodiment, the LEDs include a white surface mounted LED 28 and at least two green LED elements 30. In the detection path, a mirror 16 is advantageously positioned (e.g., a 45-degree hot mirror) to reflect the infrared light from the two or more LEDs to the autofocusing image sensor/camera 14 (e.g., autofocusing image sensor/camera within the autofocusing module). Furthermore, only one image sensor/camera 14, i.e., imager, is required to survey the focus map and acquire high-resolution images.

Figure 7:
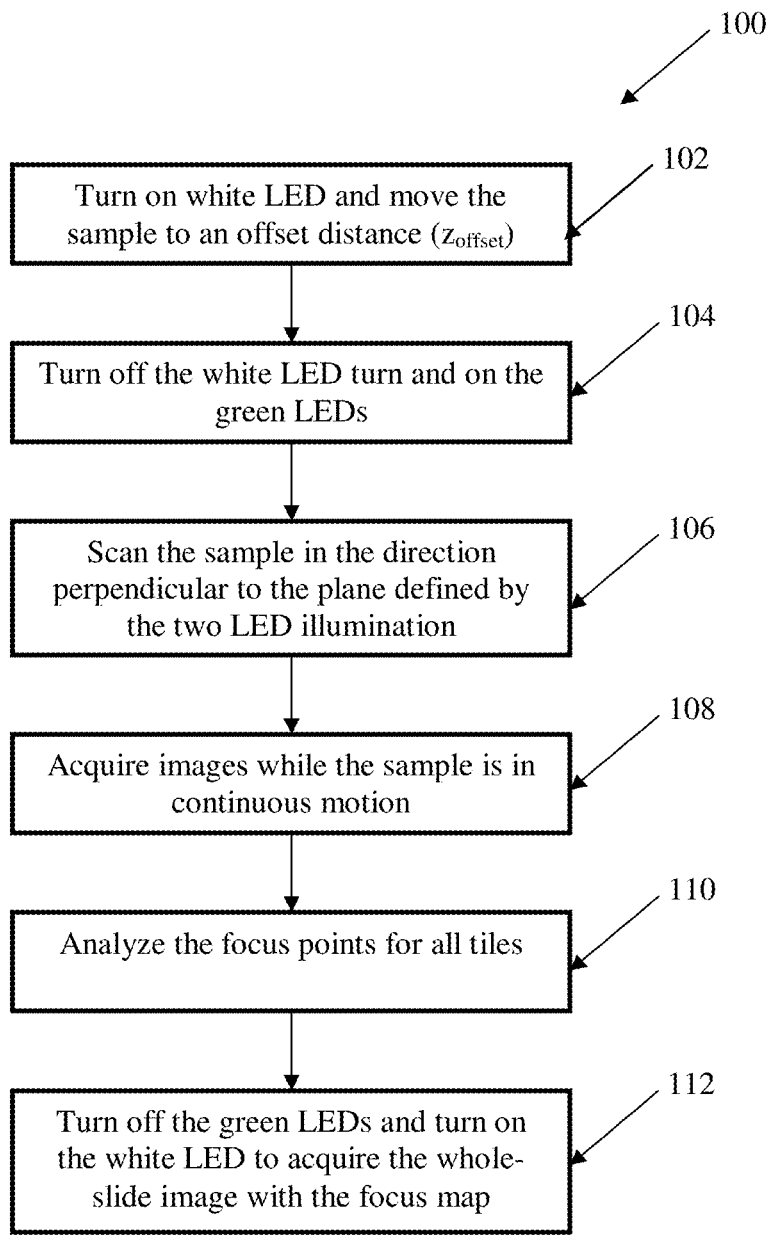
FIG. 7 shows an exemplary flow chart of the workflow for Example 2.

FIG. 7 shows an exemplary flow chart of the workflow 100 for this Example 2.

As shown in FIG. 7, the exemplary workflow 100 includes a first step 102 of turning on the white LED and moving the sample to a predefined offset position, i.e., $z_{offset}$. In doing so, out-of-focus contrast is generated using the partially coherent LED illumination. Further, this first step 102 facilitates autocorrelation analysis of the focus point. Note, if $z_{offset}$ is too small, the autocorrelation peaks generally cannot be accurately located. In this example, an offset position of 60 μm was used. However, other offset positions may be used without departing from the spirit/scope of this disclosure. By setting the defocus distance at 60 μm, a sample position from −30 μm to +30 μm can be detected, e.g., the range from 30 μm to 90 μm, as shown in FIGS. 8A2 and 8A3, can be detected.

Next, in step 104, the white LED is turned off and the at least two green LEDs are activated. If the sample is placed at a defocus position, the captured image from the main camera will contain two copies of the sample that are separated by a certain distance. The two copies are generated by the simultaneous illumination of the two LEDs. The focus plane of the sample can be defined by identifying the distance between the two copies.

Next, at step 106, the sample is scanned in a direction that is perpendicular to the plane defined by the two LED illumination. In an exemplary embodiment, the scanning direction is perpendicular to the two-copy direction of the captured image. The motion blur effect has minimal impact on the recovered focal position (see FIG. 9, discussed below).

Next, at step 108, images are acquired while the sample is in continuous motion.

Next, at step 110, previously acquired images are analyzed to generate a focus map of the sample.

Next, at step 112, the sample is moved to correct positions based on the focus map and a high-resolution whole-slide image is acquired.

FIGS. 8A1-8C show an exemplary autofocusing assembly/method. The captured images in each of FIGS. 8A1-8A3 depict the two-LED illuminated images at different focal planes. Specifically, FIG. 8A1 depicts the sample in focus, FIG. 8A2 depicts the sample in defocus with a $z_{offset}$ of 30 μm, and FIG. 8A3 depicts the sample in defocus with a $z_{offset}$ of 90 μm. The depth of field of the employed objective lens is approximately 1.3 μm with conventional Kohler illumination. As a result of the two partially coherent point LED sources, the out-of-focus contrast can be maintained over a larger z range, e.g., >100 μm, an advantage over existing methods.

Corresponding image autocorrelation plots are shown in FIGS. 8B1-8B3. As the sample moves to defocus positions, the captured images depict two copies of the sample separated by a certain distance. The two-copy separation distance can be determined from the first-order peaks of the corresponding autocorrelation plots, see FIGS. 8B1-8B3. FIG. 8C depicts the calibrated relationship between the defocus distance of the sample and the separation distance between the two-copy.

FIG. 9 shows a comparison of captured images during continuous sampling, e.g., introducing motion blur and static image capturing. FIGS. 9A1 and 9A2 show a captured image of the sample in continuous motion, at varying speeds. With further reference to FIGS. 8B1-8B3, where the captured images are in 2D and the autocorrelation is calculated in the x-direction, motion blur can be introduced in the y-direction without impacting the data.

As previously mentioned, FIGS. 9A1 and 9A2 depict the captured image with motion blur in the y-direction and FIGS. 9B1 and 9B2 depict the corresponding static image. FIGS. 9C1 and 9C2 compare the autocorrelation curves between the continuous motion case, i.e., FIGS. 9A1 and 9A2, and the static case, i.e., FIGS. 9B1 and 9B2. In comparison, motion blur does not affect the captured image if the blur is along a direction perpendicular to the direction of the two-copy, i.e., y-direction.

Of note, the designation of x-direction and y-direction is merely illustrative to assist a person skilled in the art to make and use the present disclosure. The method is not limited to such directions and/or the depiction of such directions herein.

In an exemplary embodiment, a 100-pixel motion blur enables a sample to be moved at a speed of 20 mm/s without any gain setting. Such a speed is possible because a typical camera exposure time for the two LED point sources is 1 millisecond, without setting readout gain. However, higher speeds can be achieved by reducing the exposure time and applying a readout gain.

Example 3: Multi-LED Illumination Scheme for Autofocusing in a Time-Lapse

In an exemplary embodiment, Example 2 is modified to correct the focal position of the sample in a time-lapse experiment. In this case, the method includes (i) moving the sample to an offset position, (ii) activating the multiple LEDs and capturing the image for autofocusing purposes, (iii) performing autocorrelation analysis and recovering the focus position from the locations of the first-order peaks, and (iv) moving the sample to an in-focus position.

Example 4: Multi-LED Illumination Scheme for Inferring the Focus Direction

In an exemplary embodiment, Example 2 is modified to infer the focus direction from the adjacent focus positions, instead of setting the offset position at the beginning. In this case, a focus map was created based on the adjacent focal positions of the sample. Interpolation was performed on the focus map to estimate the focus positions of the current position. The focus direction can be directly recovered from this estimate. The amount of defocus distance can be recovered from the autocorrelation analysis, shown in FIG. 8.

Example 5: Multi-LED Illumination Scheme for Autofocusing with Different LED Intensities In an exemplary embodiment, Example 2 is modified to adjust the at least two LED elements to illuminate at different intensities. By creating an asymmetrical configuration of the sample illumination, the focus position and the focus direction can be recovered simultaneously. There are at least two solutions to recover the focus direction when the captured image is 'im(x,y)' under two LEDs illumination with different intensities.

One solution to recover the focus direction is to perform the following autocorrelation: $(im(x,y)\hat{\ }c)*(im(x,y))$, where 'c' is a constant and '*' represents the autocorrelation calculation. When c=1, the equation is reduced to the regular autocorrelation operation. When 'c' is not equal to 1, the autocorrelation result will show first-order peaks with different magnitudes. The different magnitudes will provide the information as to which peaks correspond to the brighter LED and the dimmer LED. The focus direction can then be recovered as a result.

Another solution to recover the focus direction is to perform deconvolution. The at least two LEDs correspond to two delta functions with different magnitudes in the Fourier domain. For two LEDs with different intensities, only two choices are available for the deconvolution kernel. If the kernel is not correct, the resulting deconvoluted image will contain negative or imagery values which violate the physical constraint of the input intensity image. By eliminating the incorrect choice, the correct kernel is determined, which dictates the delta function that corresponds to the brighter LED. The focus direction can then be recovered as a result.

Example 6: Multi-LED Illumination Scheme for Autofocusing Via Phase-Correlation Analysis or Fourier-Ptychography Phase Retrieval In an exemplary embodiment, any one of Examples 2-5, or a combination thereof, are modified to sequentially illuminate the sample with multiple LEDs and acquire multiple images corresponding to different sets of LEDs. Phase-correlation analysis or Fourier-ptychography phase retrieval recovers the defocus distance or the in-focus position of the sample.

Example 7: Multi-LED Illumination

Figure 10A:
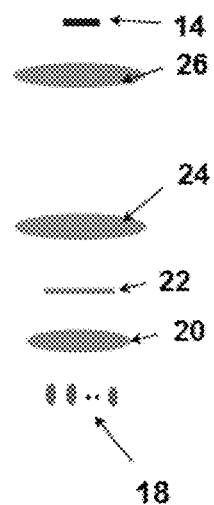
FIGS. 10A and 10B show an exemplary technique for using multi-LEDs for sample illumination, wherein (i) the captured image from the image sensor is sent to a pre-trained convolution neural network, (ii) the output of the convolution neural network is the in-focus position of the sample, and (iii) the sample is moved to an in-focus position predicted by the convolution neural network.

In an exemplary embodiment, as depicted in FIG. 10A, one can position (or use a lens to relay) two or more LEDs 18 (e.g., two or more infrared LEDs) to the back focal plane of condenser lens 20 (e.g., condenser lens of a microscope or the like). The two or more LEDs 18 are configured and adapted to illuminate the sample 22 from two or more different incident angles. Visible light remains substantially unchanged as it passes through objective lens 24 and tube lens 26 so as to be detected by camera/image sensor 14.

Figure 10B:
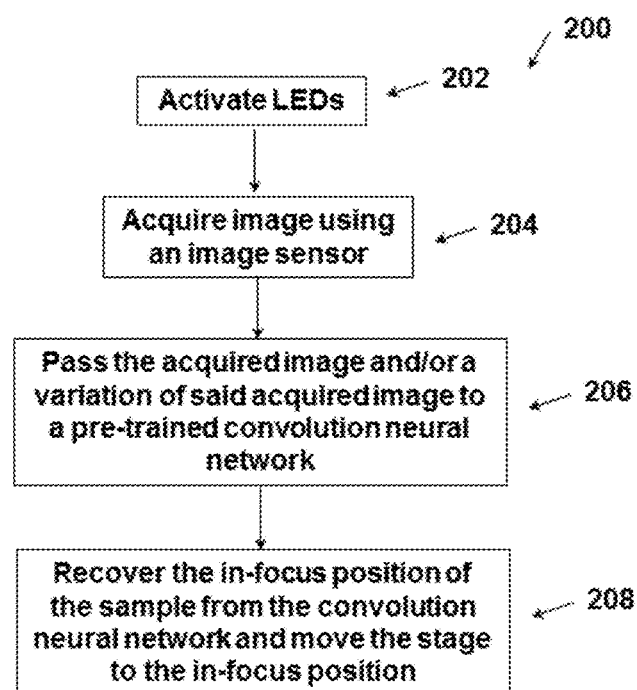

FIG. 10B shows an exemplary flow chart of the workflow 200 for this Example 7.

As shown in FIG. 10B, the exemplary workflow 200 includes a first step 202 of activating two or more LEDs. The intensity of each LED element may be the same or different.

Next, at step 204, an image is acquired using an image sensor, as discussed above.

Next, at step 206, the acquired image and/or a variation of said acquired image is passed to a pre-trained convolution neural network. The input for the convolution neural network may be the acquired image, the Fourier transform of the acquired image, the autocorrelation of the acquired image, and a combination thereof. The output layer of the convolution neural network may be a regression or classification layer.

Next, at step 208, the convolution neural network predicts the in-focus position of the sample. The in-focus position of the sample is recovered from the convolution neural network and the stage is moved to said in-focus position.

Further utilizing the multi-LED approach, the captured autofocusing image may be fed to a convolution neural network to predict the defocus distance of the sample. The convolution neural network captures an N by N pixel image and inputs said image into the input layer. The convolution neural network may further include an output regression or classification layer to predict the defocus distance of the sample. Also included, situated between the input and output layers, are multiple hidden layers that may advantageously include at least one convolution layer, pooling layer, normalization layer, and fully connected layer.

In order to train the convolution neural network, one may capture various images of microscope slides, with known defocus distances, to provide set points for the convolution neural network. Specifically, the weight of different layers within the convolution neural network are generally adjusted during the training process to best fit the captured data.

Although the systems/methods of the present disclosure have been described with reference to exemplary embodiments thereof, the present disclosure is not limited to such exemplary embodiments/implementations. Rather, the systems/methods of the present disclosure are susceptible to many implementations and applications, as will be readily apparent to persons skilled in the art from the disclosure hereof. The present disclosure expressly encompasses such modifications, enhancements and/or variations of the disclosed embodiments. Since many changes could be made in the above construction and many widely different embodiments of this disclosure could be made without departing from the scope thereof, it is intended that all matter contained in the drawings and specification shall be interpreted as illustrative and not in a limiting sense. Additional modifications, changes, and substitutions are intended in the foregoing disclosure. Accordingly, it is appropriate that the appended claims be construed broadly and in a manner consistent with the scope of the disclosure.

The invention claimed is:

1. An imaging assembly comprising:
a microscope having a lens;
an autofocusing camera positioned adjacent to the microscope;
first and second LEDs positioned adjacent to the microscope;
wherein the first and second LEDs are configured and adapted to illuminate a sample of the microscope from two different incident angles;
wherein the autofocusing camera is configured and adapted to provide an image of the illuminated sample, the image including two image copies of the sample; and
wherein identification of a translational shift of the two image copies allows a user to identify an in-focus position of the sample.

2. The assembly of claim 1, wherein the lens is a condenser lens, and light from the first and second LEDs is transmitted to the back focal plane of the condenser lens to illuminate the sample from the two different incident angles.

3. The assembly of claim 1, wherein the lens is an objective lens, and light from the first and second LEDs is transmitted to the back focal plane of the objective lens to illuminate the sample from the two different incident angles.

4. The assembly of claim 1, wherein the first and second LEDs are infrared LEDs.

5. The assembly of claim 1 further comprising a mirror positioned adjacent to the microscope, the mirror configured and dimensioned to reflect and transmit light from the first and second LEDs to the autofocusing camera.

6. The assembly of claim 5, wherein the mirror is a 45-degree hot mirror.

7. The assembly of claim 1, wherein the identification of the in-focus position of the sample occurs without scanning the sample along the depth or z-direction of the sample.

8. The assembly of claim 1, wherein the in-focus position of the sample is provided through a main camera port of the microscope.

9. The assembly of claim 1, wherein the autofocusing camera is mounted to the microscope.

10. The assembly of claim 1, wherein the autofocusing camera is mounted to an autofocusing module.

11. An imaging method comprising:
providing a microscope having a lens;
positioning an autofocusing camera adjacent to the microscope;
positioning first and second LEDs adjacent to the microscope;
illuminating a sample of the microscope from two different incident angles via the first and second LEDs;
acquiring an image of the illuminated sample via the autofocusing camera, the image including two image copies of the sample;
utilizing the image to identify a translational shift of the two image copies; and
utilizing the translational shift of the two image copies to identify an in-focus position of the sample.

12. The method of claim 11, wherein the lens is a condenser lens, and light from the first and second LEDs is transmitted to the back focal plane of the condenser lens to illuminate the sample from the two different incident angles.

13. The method of claim 11, wherein the lens is an objective lens, and light from the first and second LEDs is transmitted to the back focal plane of the objective lens to illuminate the sample from the two different incident angles.

14. The method of claim 11, wherein the first and second LEDs are infrared LEDs.

15. The method of claim 11 further comprising a mirror positioned adjacent to the microscope, the mirror configured and dimensioned to reflect and transmit light from the first and second LEDs to the autofocusing camera.

16. The method of claim 15, wherein the mirror is a 45-degree hot mirror.

17. The method of claim 11, wherein the identification of the in-focus position of the sample occurs without scanning the sample along the depth or z-direction of the sample.

18. The method of claim 11, wherein the in-focus position of the sample is provided through a main camera port of the microscope.

19. The method of claim 11, wherein the autofocusing camera is mounted to the microscope.

20. The method of claim 11, wherein the autofocusing camera is mounted to an autofocusing module.

21. An imaging method, comprising:
providing a microscope having a lens and an autofocusing camera positioned adjacent to the microscope;
positioning a white LED and first/second LEDs adjacent to the microscope;
moving a sample to a predefined offset position and illuminating the sample from two different incident angles via the first and second LEDs;
acquiring an image of the illuminated sample via the autofocusing camera, the image including two image copies of the sample;
scanning the sample in a direction that is perpendicular to the plane defined by the two LED illumination; and
acquiring images while the sample is in continuous motion.

22. The method of claim 21, further comprising utilizing the images to generate a focus map of the sample.

23. The method of claim 22, further comprising utilizing the focus map to move the sample to an in-focus position to capture a high-resolution whole-slide image.

24. The method of claim 21, wherein the first and second LEDs are green.

25. The method of claim 21, wherein the offset position is 60 µm.

26. The method of claim 21, wherein the sample is moved at 22 mm/s without any gain setting.

27. An imaging method, comprising:
provide a microscope having a lens and an autofocusing camera positioned adjacent to the microscope;
positioning a first and second LEDs adjacent to the microscope;
moving a sample to a predefined offset position and illuminating the sample from two different incident angles via the first and second LEDs;
acquiring an image of the illuminated sample via the autofocusing camera, the image including two image copies of the sample; and
utilizing a convolution neural network to identify an in-focus position of the sample.

28. The imaging method of claim 27, wherein the convolution neural network further comprises an input layer and output layer.

29. The imaging method of claim 28, wherein the convolution neural network further comprises at least one hidden layer situated between the input and output layers; and wherein the hidden layers are selected from a group consisting of a convolution layer, pooling layer, normalization layer, fully connected layer, and a combination thereof.

30. The imaging method of claim 29, wherein the convolution neural network is trained to accurately define the weight applied to the layers.

* * * * *